July 10, 1934.     H. F. KRÜGER     1,965,978
ACCOUNTING MACHINE FOR REJECTING ONE-CARD GROUPS
Filed Aug. 17, 1927
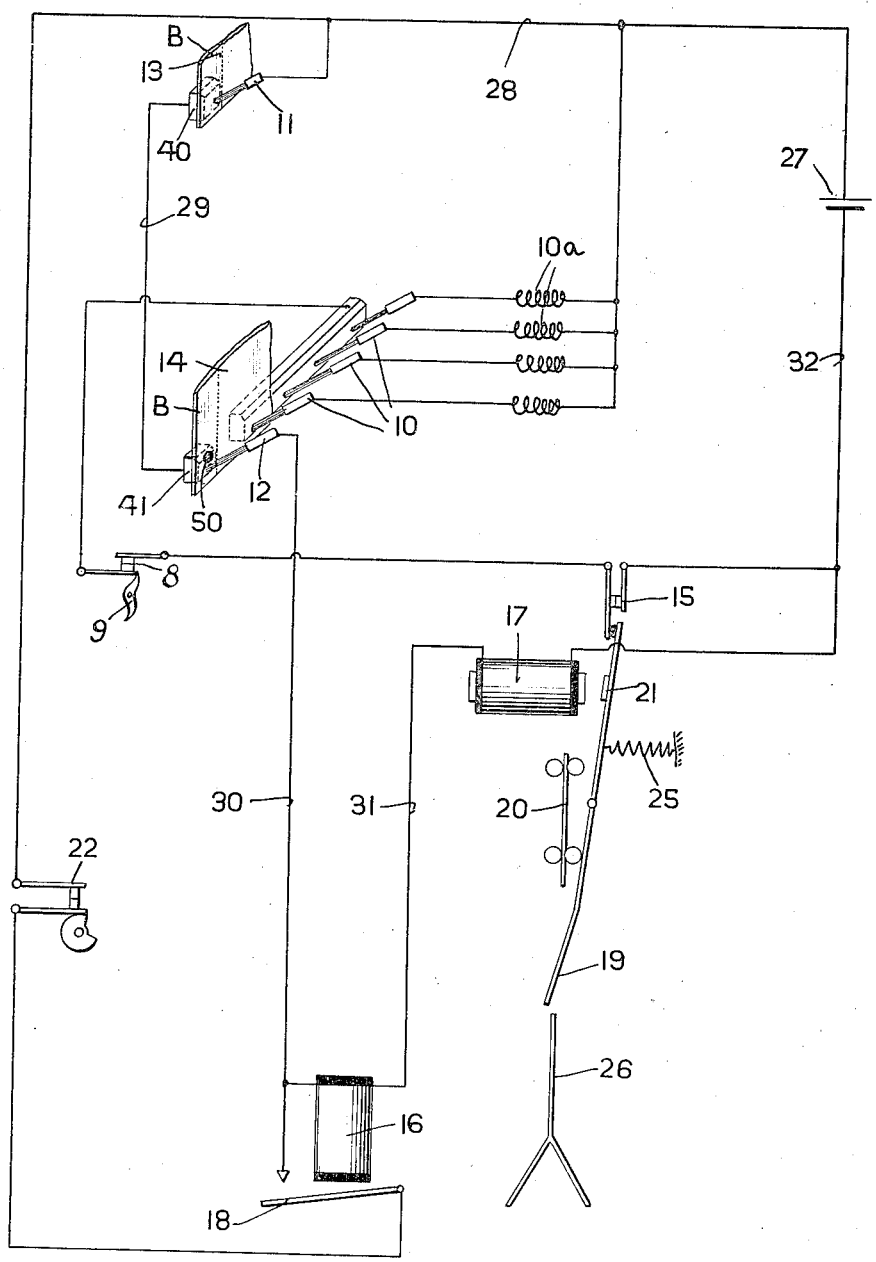
Inventor
Hermann Friedrich Krüger
By his Attorney
WMWilson Patented July 10, 1934

1,965,978

UNITED STATES PATENT OFFICE 1,965,978

ACCOUNTING MACHINE FOR REJECTING ONE-CARD GROUPS

Hermann Friedrich Krüger, Hamburg, Germany, assignor, by mesne assignments, to International Business Machines Corporation, New York, N. Y., a corporation of New York Application August 17, 1927, Serial No. 213,480

9 Claims. (Cl. 235—92)

The invention relates to accounting machines and more particularly to machines adapted to sort out certain single records from other records which occur in groups or to tabulate or list from records which occur only in groups eliminating from the tabulating or listing records which occur singly or vice versa. For the purpose of explanation the invention will be explained in connection with a banking system in which perforated record cards are used for accounting purposes. It will be understood, however, that the system is applicable to any other businesses in which similar problems arise and the particular example is chosen merely to visualize the operation of the system. It may be assumed that in a certain bank a balance card is properly perforated to indicate the balance of each customer at the beginning of an accounting period. During the period any withdrawal or deposit will be likewise recorded by perforating a card and also if desired this latter card or another one may be perforated to represent the balance after the transaction. Those cards which are perforated to indicate a customer's balance at the beginning of an accounting period are hereinafter referred to as balance cards while those cards which are perforated to represent deposits or withdrawals or modified balances during the period are referred to as transaction cards.

It is customary in banks to send each customer, whose account has changed in status during the accounting period, a statement showing the balance at the beginning of the period, a list of all deposits and withdrawals and the balance at the end of the period. Such statements, however, need not be sent to those customers whose accounts show no change in status during the period. Now, if the statements are to be printed on a printing tabulator under control of the perforated cards it is necessary to withdraw from the file the balance cards of customers whose accounts have not changed so that statements will not be made for such accounts. Any customer whose account has been modified will have one balance card and one or more transaction cards and any customer whose account has not been modified during the period will have only a single balance card. The problem therefore is to separate single balance cards from groups of balance and transaction cards any of which groups may contain two or more cards. Heretofore no machine has been designed which will differentiate between card groups consisting of one card and card groups which may consist indiscriminately of any number of cards greater than one.

One object of the present invention is to provide a sorting machine whose purpose is to withdraw such single cards by means of a comparing operation. Thus card groups consisting of single cards, that is, balance cards, are separated from card groups which consist of balance cards with one or more additional cards representing transactions. After this sorting operation the usual statements may be prepared on listing tabulators from those groups which consist of a balance card and one or more transaction cards.

In certain cases it may not be necessary to actually sort the single cards in the sense that they are physically separated from the others but it will be sufficient if the single cards are eliminated from a tabulating or listing operation when the entire card file is tabulated. For example, the bank may desire certain comparative data regarding only those accounts which were active during a given accounting period. It might be desired to obtain the total balance of the active accounts at the beginning of the period and all deposits and withdrawals during the period. Here no tabulating would be desired of balance cards which had no accompanying transaction cards but the complete file might be passed through a tabulating machine in which tabulating would be suppressed on the single balance cards whereupon the tabulating operation would concern only the active accounts, and any auxiliary sorting operation would be unnecessary. In like manner single balance cards might be eliminated from listing operations without physically removing them from the file.

According to the invention it is proposed to identify balance cards by a perforation in a selected card field, preferably at the lower left hand corner of the card and to omit this perforation from transaction cards. The machine is provided with special analyzing mechanism consisting of two analyzing elements which are spaced apart so that this identifying perforation position in successive cards will be analyzed simultaneously by the elements. Now if the card under one of the analyzing elements is a balance card, that is, one with an identifying perforation, and the card under the other element has no balance designating perforation both cards will be passed into a given sorting pocket or in the case of a tabulating machine the data on both cards will be accumulated or printed or both. If cards which have no perforations identifying them as balance cards are analyzed by both elements the same operation occurs. If, however, successive cards under the two elements each have an identifying perforation, showing them to be balance cards, the controlling mechanism will serve to sort the first card into another sorting pocket or to suppress tabulating of the data thereon as the case may be. If all the cards in the file are arranged with each customer's balance card followed by his transaction cards and the entire file is then passed through either of the machines it will be obvious that the cards of all customers whose accounts have been active during the period will be separated from the customer's cards whose accounts have been inactive or the data from the active accounts will be tabulated while the data from the inactive accounts will not be tabulated.

The invention is shown by way of example in the accompanying drawing to which reference should be had for a more complete explanation and in which the single figure shows the invention applied to a combined sorter and tabulator.

The machine illustrated is energized from a source of energy indicated as a battery 27. It is provided with upper and lower brushes 11 and 12, respectively, to which the usual tabulating cards are fed successively by suitable feeding mechanism (not shown). The arrangement is such that each card passes beneath the lower brush 12 exactly one machine cycle later than it passes beneath the upper brush 11; that is, the brushes 11 and 12 analyze corresponding positions on successive cards simultaneously. The upper and lower brushes coact with individual contact blocks 40 and 41, the blocks being electrically connected by a wire 29. The upper brush 11 is connected directly to one terminal of the battery 27 while the lower brush is connected to the other terminal of the battery through a series circuit including the magnets 16 and 17. The armature 21 of the magnet 17 is mounted on a pivoted deflector member 19 urged to the position shown in the drawing, by a spring 25. The deflector 19 cooperates with a wall 26 and, depending upon the energization status of the magnet 17, sorts the record cards after they leave the lower brushes to the right or left of the wall 26. In the drawing a card 20 is shown in position to be passed to the left of the wall by the deflector 19 which will occur whenever the magnet 17 is de-energized. When the magnet 17 is energized to attract its armature, the deflector 19 is shifted to pass the record cards to the right of the wall 26.

A certain field of the record cards indicated generally at B in the drawing, is adapted to receive a perforation in a given position, if the card is a balance card, while the perforation is omitted if the card is a transaction card. The card 14 under the lower brushes 12 is provided with a perforation 50 identifying it as a balance card, while the card 13 under the upper brushes 11 has no identifying perforation and is therefore a transaction card. The problem is to sort single balance cards from balance cards which have accompanying transaction cards. When neither brush 11 or 12 encounters a perforation in the field B the circuit extending through the brushes 11 and 12 and the magnets 16 and 17 in series, remains deenergized during the complete card cycle. The circuit likewise remains open if only one of the brushes 11 or 12 encounters a perforation in the field B. If a balance card under the lower brushes is followed by a transaction card under the upper brushes then or if two transaction cards are under the brushes or a transaction card is followed by a balance card, the circuit including the magnet 17 will not be energized. The deflector 19 will remain in the position shown in the drawing and each card as it leaves the lower brushes will be passed to the left of the wall 26 by the deflector 19. If a balance card under the lower brushes is followed by another balance card under the upper brushes, a circuit will be established instantaneously extending from the battery 27 through wire 28 to upper brush 11, thence through its coacting contact block 40, wire 29, block 41 and lower brush 12 to magnet 16 thence through wire 31 and magnet 17 to the other terminal of the battery 27. The magnet 17 thus being energized attracts its armature 21 and shifts the deflector 19 to its alternative position to pass the card under the lower brush to the right of the wall 26. In this manner, whenever a balance card is followed by another balance card, meaning that the first balance card has no accompanying transaction cards, it will be sorted out from the file.

In the present machine, additional lower brushes 10 are provided to analyze record cards for data designating perforations in other card columns and enter the data into accumulators or printers represented diagrammatically at 10a. The several circuits extend from battery 27 to one of the operating coils 10a and one of the brushes 10, through contacts 8 controlled by a card lever 9 (which are similar respectively to contacts 20 and the card operated lever carrying the roller 25 of the Hollerith Patent #945,236 and which operate in the same manner), to a pair of contacts 15 controlled by the deflector member 19 and thence to the other side of the battery 27. Whenever the magnet 17 is energized, the contacts 15 are opened and prevent energization of the operating magnets 10a. The energization of magnet 17 from the brushes 11 and 12 is instantaneous and a stick circuit must be provided to hold this magnet energized while the entire data bearing area of the card under the lower brushes is being analyzed and until the card is properly sorted to the right or left of the wall 26. This stick circuit is controlled by the magnet 16 and includes cam operated contacts 22 which are designed to open between cards but to close during that period of each cycle in which the brushes are searching the entire data bearing portion of the card. When the magnet 16, in series with the magnet 17, is energized it attracts its armature 18 and closes the stick circuit extending through the cam contacts 22, whereupon the magnet 17 after being once energized in a cycle, remains energized sufficiently long to prevent closure of the contacts 15 while the card is being tabulated and to prevent restoring of the deflector 19 until a card which should pass to the right of the wall 26 has been properly deflected. In this manner single balance cards having no accompanying transaction cards will be excluded from tabulating operation in regard to operating magnets 10a.

What is claimed is as follows:

1. In a record controlled machine, accounting mechanism, a pair of record sensing stations, means for analyzing records at one station for controlling the accounting mechanism according to data on the records, and means for analyzing records at both stations for controlling the operability of the accounting mechanism to cause the latter to be operative during the passage of a record past the station that controls the accounting mechanism when one of the records of a first class occurs with one or any number of records a second class, and to render the accounting mechanism inoperative during the passage of a record past the station that controls the accounting mechanism when records of only the first class are presented to both record sensing stations.

2. In a record controlled accounting machine, accounting mechanism, an analyzing station for controlling the accounting mechanism according to data on records, a supplemental analyzing station for analyzing records, means for concurrently analyzing records at both of said stations, and selective means controlled thereby according to like designations on a pair of records of only one class of two different classes to prevent operation of the accounting mechanism when one of the records is fed past the first named analyzing station, and to cause operation of the accounting mechanism by the passage of a card having a designation like that of the pair of records first mentioned past the first named analyzing station when it occurs with any number of records of another class.

3. In a record controlled accounting machine, in combination, analyzing means for searching records to determine the presence in successive records; of identical classification characteristics of one kind on successive transaction records; identical classification characteristics of another kind on other successive balance records; non-identical classification characteristics comprising the two different kinds, and means controlled by said analyzing means for effecting a normal type of machine operation on the occurrence of non-identical controlling classification characteristics on successive records and continuing it for following records of the first mentioned kind and for suppressing the normal type of operation and substituting another predetermined type of operation on the occurrence of identical controlling classification characteristics of successive balance records and as long as the identical controlling classification characteristics if only this kind persist on the records.

4. In a record controlled accounting machine employing records of a balance class, in combination, accounting mechanism, a pair of record sensing stations with record analyzing mechanism at each, means controlled by the analyzing mechanism at one station for controlling the accounting mechanism according to data on the records, and selective means controlled conjointly by the analyzing mechanism at both stations for rendering the accounting mechanism inoperative when a pair of records of only the balance class is sensed and operative when a single record of said class occurs with one or any number of records of another class.

5. In a record controlled machine employing records of a balance class, in combination, means to govern the type of machine operation, means for analyzing records in pairs, and means controlled thereby for controlling the governing means to effect one type of machine operation for a pair of records of only the balance class and to effect another type of machine operation when a record of the balance class occurs together with one record of another class and continuing the last mentioned type of machine operation for each successive record of the other class.

6. In an accounting machine controlled by records of two different classes, in combination, accounting mechanism, means for analyzing successive records, and means controlled thereby for excluding operations of the accounting mechanism when successive records of the same class comprising only one of said classes occur, and for effecting accounting operations when a record of the class that excludes accounting operations occurs with one or any number of records of the other class.

7. In a machine of the class described, in combination, analyzing mechanism for analyzing records occurring in a pair comprising a record of a first class with a record of a second class, accounting mechanism, and means whereby said analyzing mechanism effects the operation of the accounting mechanism when a pair of records of the two distinct classes is analyzed.

8. In a machine of the class described, in combination, analyzing mechanism for analyzing records occurring in pairs having the same classification designations, of accounting mechanism, and means whereby said analyzing mechanism controls the machine to prevent the operation of the accounting mechanism when a pair of records having the same classification designations is analyzed.

9. In a machine of the class described, in combination, analyzing mechanism for concurrently analyzing a record of a first class with a record of a second class, data representing mechanism, and means controlled by said analyzing mechanism for preventing an operation of the data representing mechanism when a pair of records of only the first class is analyzed and for causing the operation of the data representing mechanism when a record of the first class occurs with one or any number of records of the second class.

HERMANN FRIEDRICH KRÜGER.